(12) United States Patent
Lickteig

(10) Patent No.: US 10,034,437 B2
(45) Date of Patent: *Jul. 31, 2018

(54) LAWN DEBRIS HOPPER, AND ASSOCIATED DEVICES, SYSTEMS AND METHODS

(71) Applicant: Professional Lawn Care, LLC., Waterloo, IA (US)

(72) Inventor: Dennis Lickteig, Waterloo, IA (US)

(73) Assignee: Professional Lawn Care, LLC, Waterloo, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,149

(22) Filed: Feb. 25, 2016

(65) Prior Publication Data

US 2017/0295726 A1    Oct. 19, 2017

Related U.S. Application Data

(63) Continuation of application No. 14/527,275, filed on Oct. 29, 2014, now Pat. No. 9,271,450.

(60) Provisional application No. 61/897,048, filed on Oct. 29, 2013.

(51) Int. Cl.
*A01G 1/12* (2006.01)
*A01G 20/43* (2018.01)

(52) U.S. Cl.
CPC ............. *A01G 20/43* (2018.02); *A01G 1/125* (2013.01)

(58) Field of Classification Search
CPC .... A01G 1/125; E01H 1/0854; E01H 1/0845; A47L 11/24; A47L 11/4013
See application file for complete search history.

(56) References Cited

U.S. PATENT DOCUMENTS

| | | | | |
|---|---|---|---|---|
| 4,164,820 A * | 8/1979 | Krickovich | ........... | E01H 1/0845 15/340.3 |
| 4,201,348 A * | 5/1980 | Bigbee | ................. | A23N 17/007 241/101.76 |
| 4,393,537 A * | 7/1983 | Reprogle | ................ | A47L 11/24 15/340.2 |
| 5,030,259 A * | 7/1991 | Bryant | ................. | B01D 50/002 15/340.1 |
| 5,784,756 A * | 7/1998 | Slocum | ................ | A46B 13/001 15/182 |
| 7,171,725 B2 * | 2/2007 | Sjoberg | ................... | A47L 9/108 15/347 |

* cited by examiner

*Primary Examiner* — Dung Van Nguyen
(74) *Attorney, Agent, or Firm* — Davis, Brown, Koehn, Shors & Roberts, P.C.; Matthew Warner-Blankenship

(57) ABSTRACT

A debris collector and associated systems and methods are disclosed. The debris collector is configured to receive and process debris, such as lawn debris, by way of a variety of intake systems, such as a basket and vacuum tube. After intake, the debris collector is configured to process the debris by way of an auger and agitators, so as to be passed through a blower fan for disposal.

20 Claims, 16 Drawing Sheets

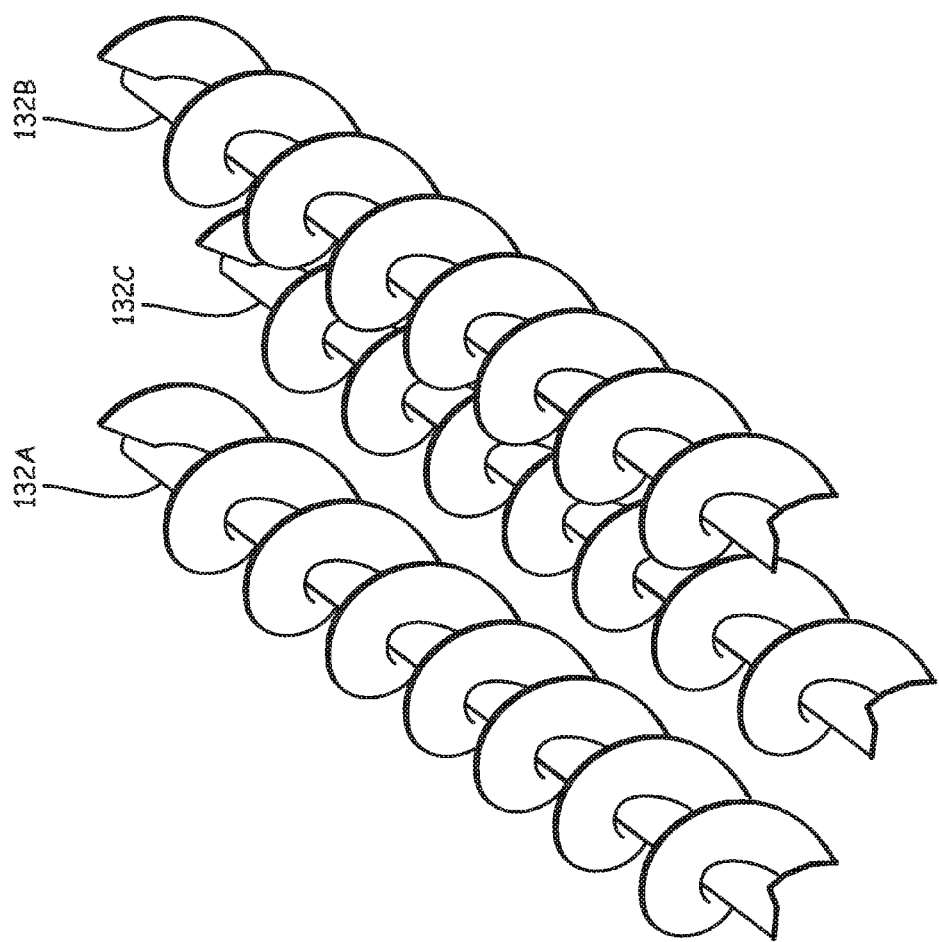

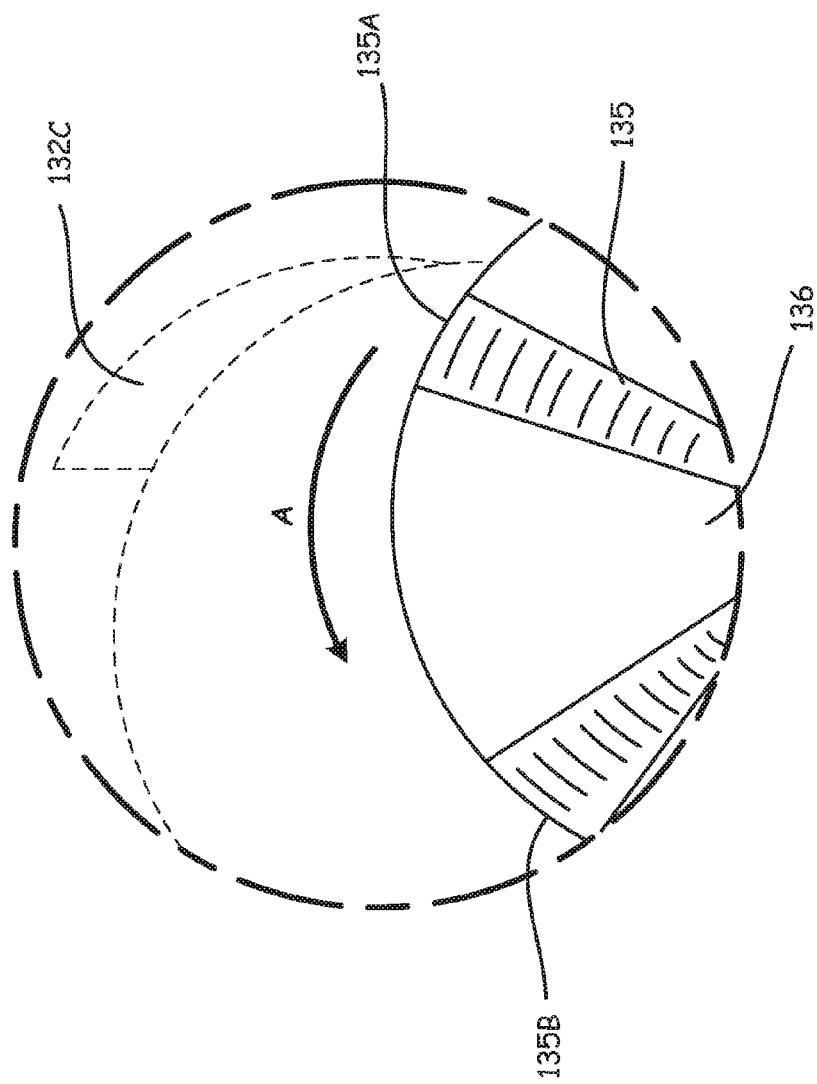

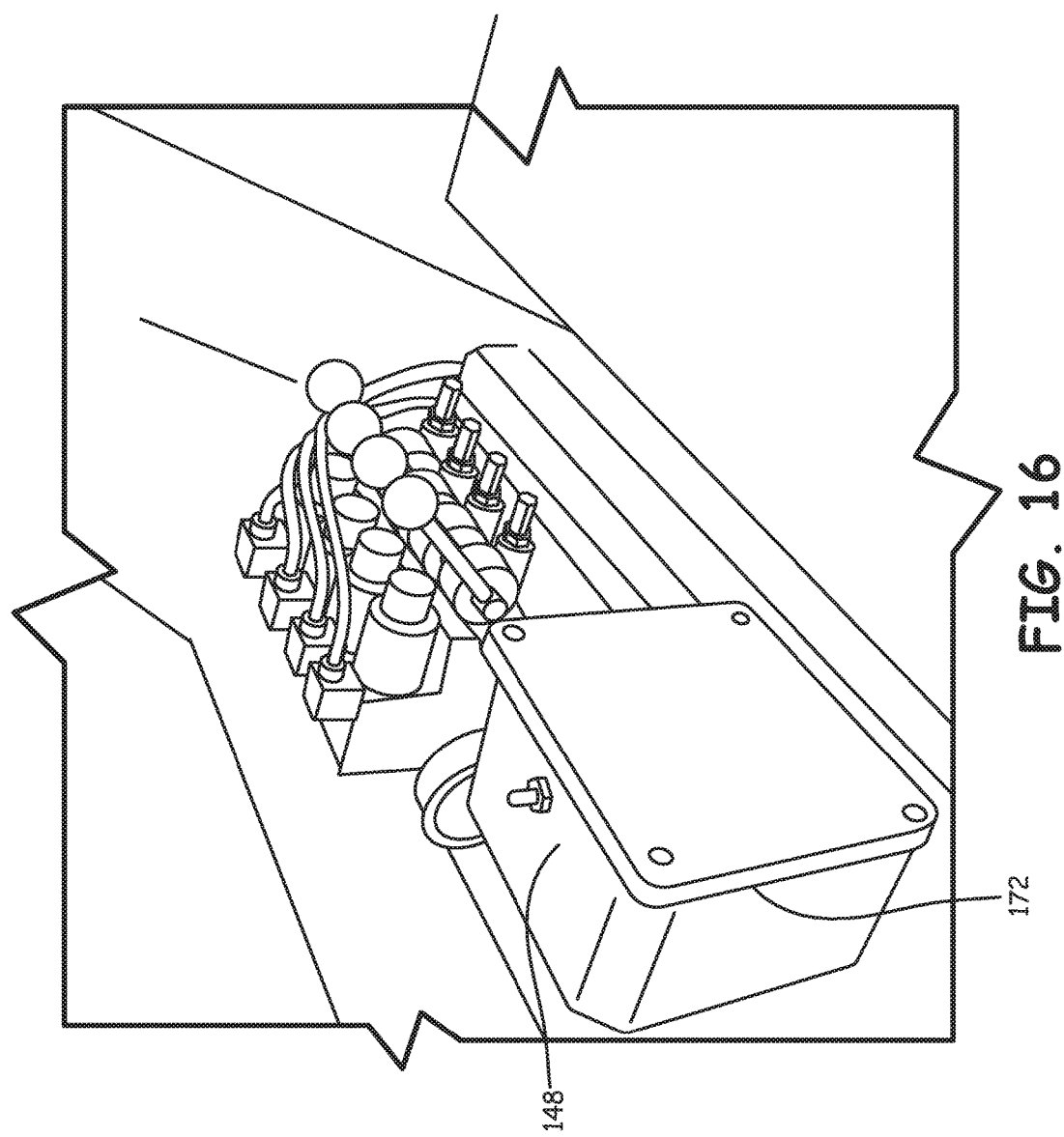

LAWN DEBRIS HOPPER, AND ASSOCIATED DEVICES, SYSTEMS AND METHODS

CROSS-REFERENCE TO RELATED APPLICATION(S)

This application is a continuation of U.S. application Ser. No. 14/527,275, filed Oct. 29, 2014, entitled "Lawn Vacuuming System with Hopper," which claims priority from U.S. Provisional Application 61/897,048, filed Oct. 29, 2013, and entitled "Lawn Vacuuming System with Hopper," which is hereby incorporated herein by reference in its entirety.

FIELD OF THE INVENTION

The disclosed apparatus, methods and system relate to the collection and removal of lawn debris.

BACKGROUND OF THE INVENTION

Particularly in the fall, large amounts of debris, such as leaves, fall on lawns. There is a need in the art for improved apparatus, systems and methods for efficient, high volume collection and removal of lawn debris.

BRIEF SUMMARY OF THE INVENTION

As discussed herein, the "debris collector" relates to various apparatus and methods relating to the collection and removal of debris by way of a collection reservoir specially adapted to receive and process the debris before blowing it into a truck for removal.

While multiple embodiments are disclosed, still other embodiments of the debris collector will become apparent to those skilled in the art from the following detailed description, which shows and describes illustrative embodiments. As will be realized, the invention is capable of modifications in various obvious aspects, all without departing from the spirit and scope of the debris collector. Accordingly, the drawings and detailed description are to be regarded as illustrative in nature and not restrictive.

BRIEF DESCRIPTION OF THE DRAWINGS

FIG. 14 depicts an internal endlong view of the debris housing showing the agitators and augers, according to an exemplary embodiment.

FIG. 15 depicts a view of the augur blades and blower, according to an exemplary embodiment.

FIG. 16 depicts an external view of the hydraulic system and control switch according to one embodiment.

DETAILED DESCRIPTION

The present apparatus, systems and methods disclose a debris collector which addresses these flaws in the prior art. For brevity, embodiments will be discussed in reference to the "debris collector," though as one of skill in the art would be readily aware, this can comprise various aspects of the disclosed apparatus and methods.

Exemplary embodiments of the debris collector comprise a chassis set on wheels for towing, and further comprising a walled, generally rectangular debris housing, or "hopper" having first and second sides and first and second (or front and back) ends, and a floor. Exemplary embodiments further comprise at least one auger and at least one agitator mounted lengthwise at or near the floor, with the individual ends reaching substantially the length of the floor from the first end to the second end. In certain exemplary embodiments, a collection device is also present, and is operated by a power source, such as a hydraulic system and/or gas, diesel or electrical means, such as an engine or motor, which can also be mounted on the chassis for operational communication with the fan or blower, which may be powered by way of a crankshaft and clutch assembly, as would be known by one of skill in the art, and also be in operational communication with the hydraulic system and pumps so as to power the various hydraulic devices, such as arms, augers, agitators and the like.

In exemplary embodiments, the debris collector operates to allow side and rear loading of debris, such as leaves, into the hopper for digestion via the auger and separator, and then the device is equipped to blow or otherwise transport the ground or otherwise processed debris into a truck for removal. In further embodiments, the debris collector comprises at least one collection opening, which can be in operational communication with a hose for direct debris collection.

Figure 1:
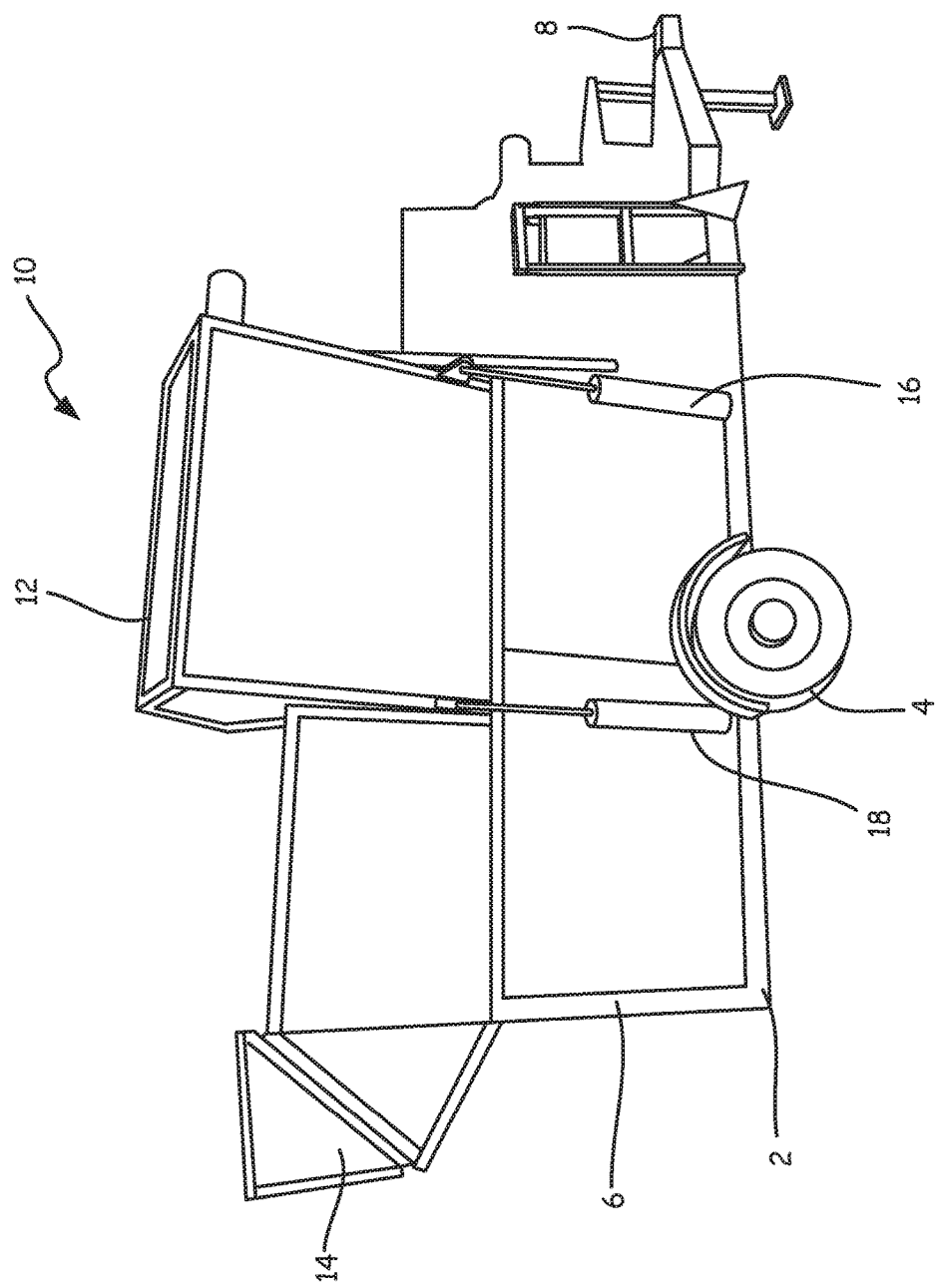
FIG. 1 depicts a side view of an exemplary embodiment of the debris collector.

Referring now to the figures with particularity, FIG. 1 depicts a side view of an exemplary embodiment of the debris collector 10, which comprises a chassis 2 set on a plurality of wheels 4 for towing, and further comprising a walled, generally rectangular debris housing, or hopper 6 configured to receive lawn waste, and a hitch 8 for attachment to a towing vehicle (not shown). FIG. 1 further depicts an embodiment further comprising a side collector 12 (hereinafter also referred to as a "basket") in an upright position and rear collector 14, also in an upright position. In these embodiments, either the side collector 12 and/or the rear collector can be operated by at least one hydraulic arm, 16, 18 so as to facilitate the transition of debris into the hopper.

Figure 2:
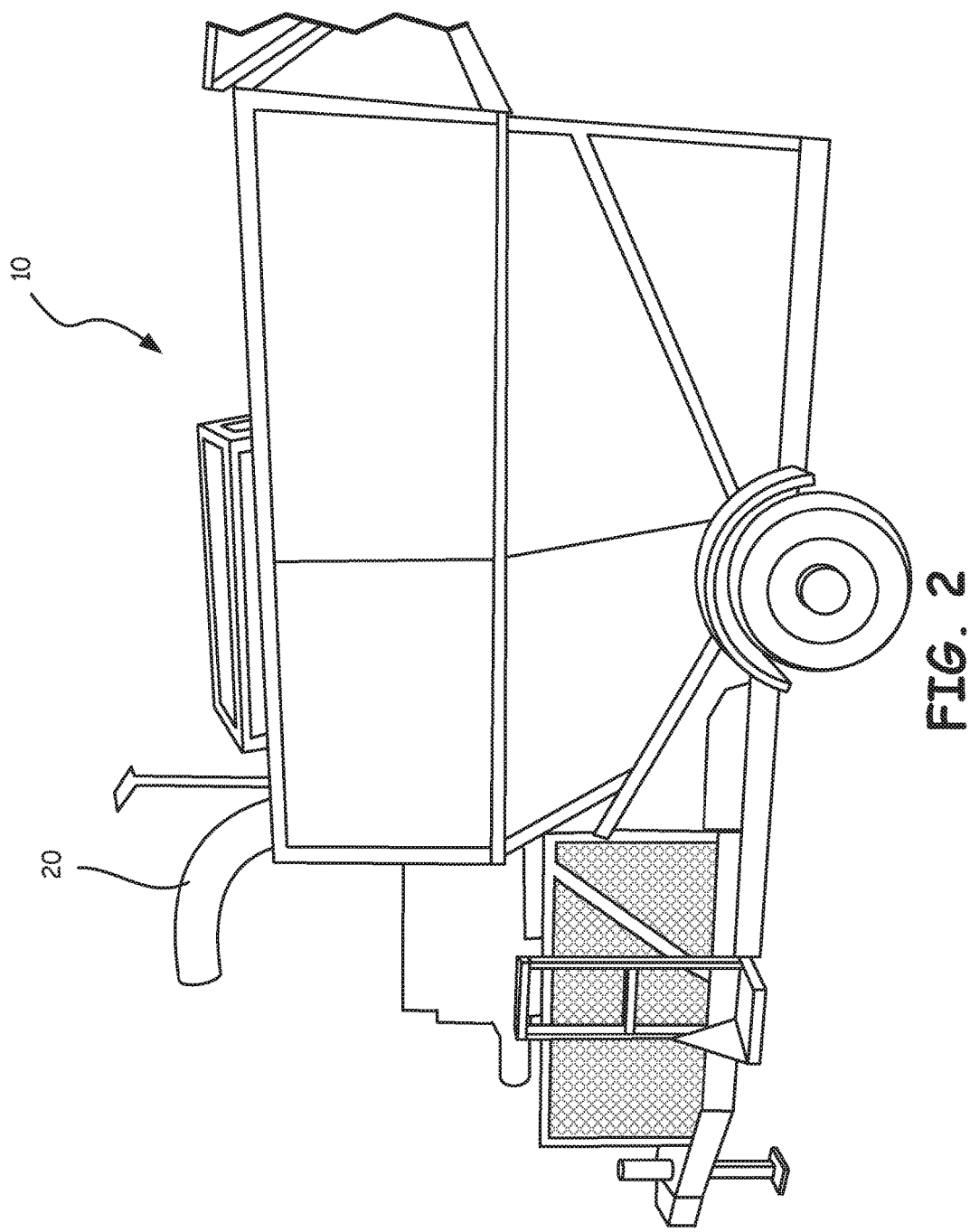
FIG. 2 depicts a reverse side view of the embodiment of FIG. 1

FIG. 2 depicts the opposite view of the embodiment of FIG. 1, and further shows the blower discharge 20, which in certain embodiments is adjustable as to height. In certain embodiments, a hydraulic cylinder, gin pole, cable and pulleys, or other known means can be utilized to adjust the height of the discharge to the appropriate level for a receiving truck (not shown). In operation, the debris collector functions to allow the user to rapidly collect lawn debris by way of the basket, rear collector or other means (as discuss in relation to FIG. 10) so as to be processed by the auger or augers (as depicted in relation to FIG. 5) and then blown out the blower discharge into a truck or other transportation device having been broken down, shredded, ground, or otherwise processed by the auger or augers.

Figure 3:
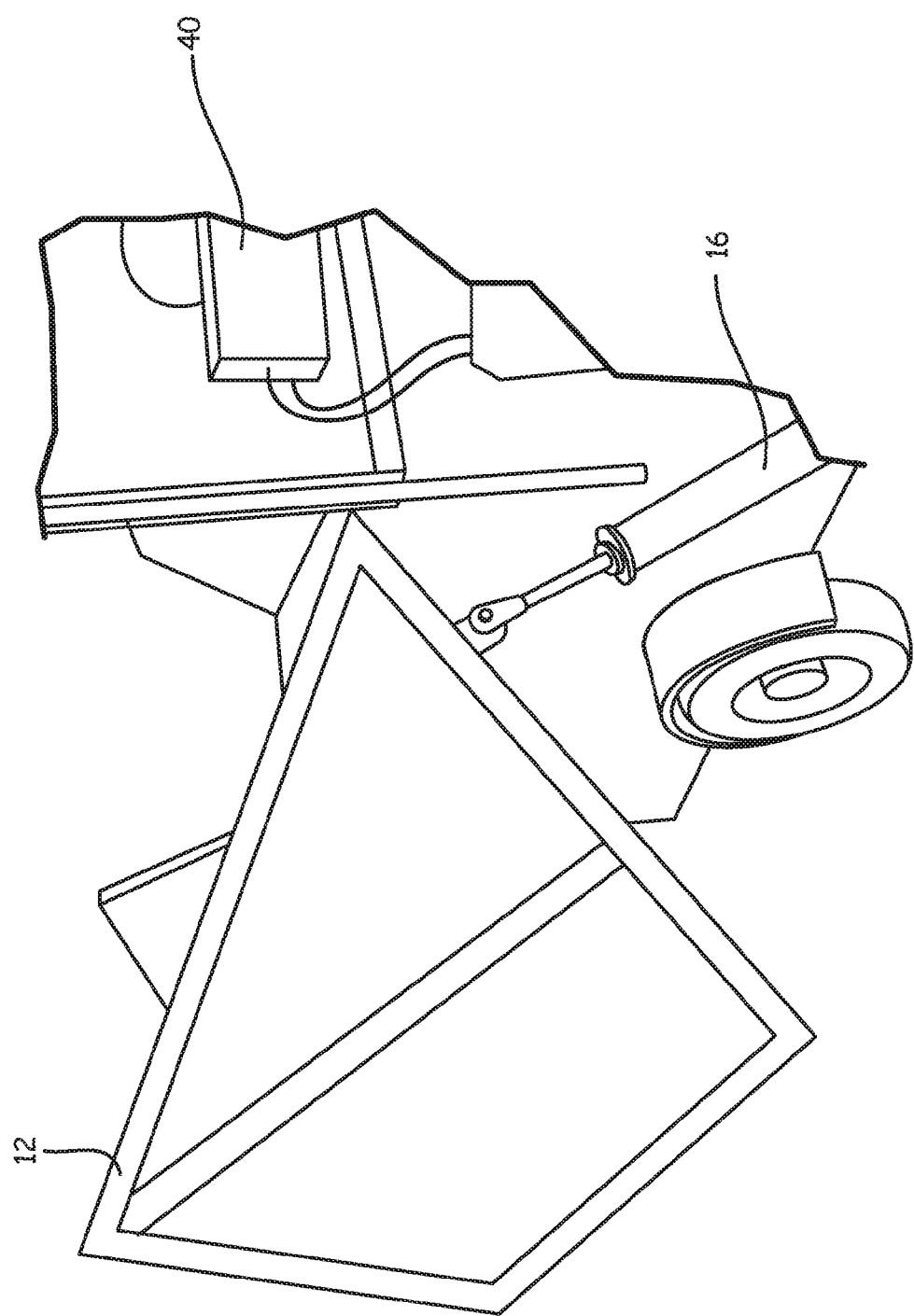
FIG. 3 depicts a front quarter side view of an embodiment of the debris collector showing the basket in a halfway position.
Figure 6:
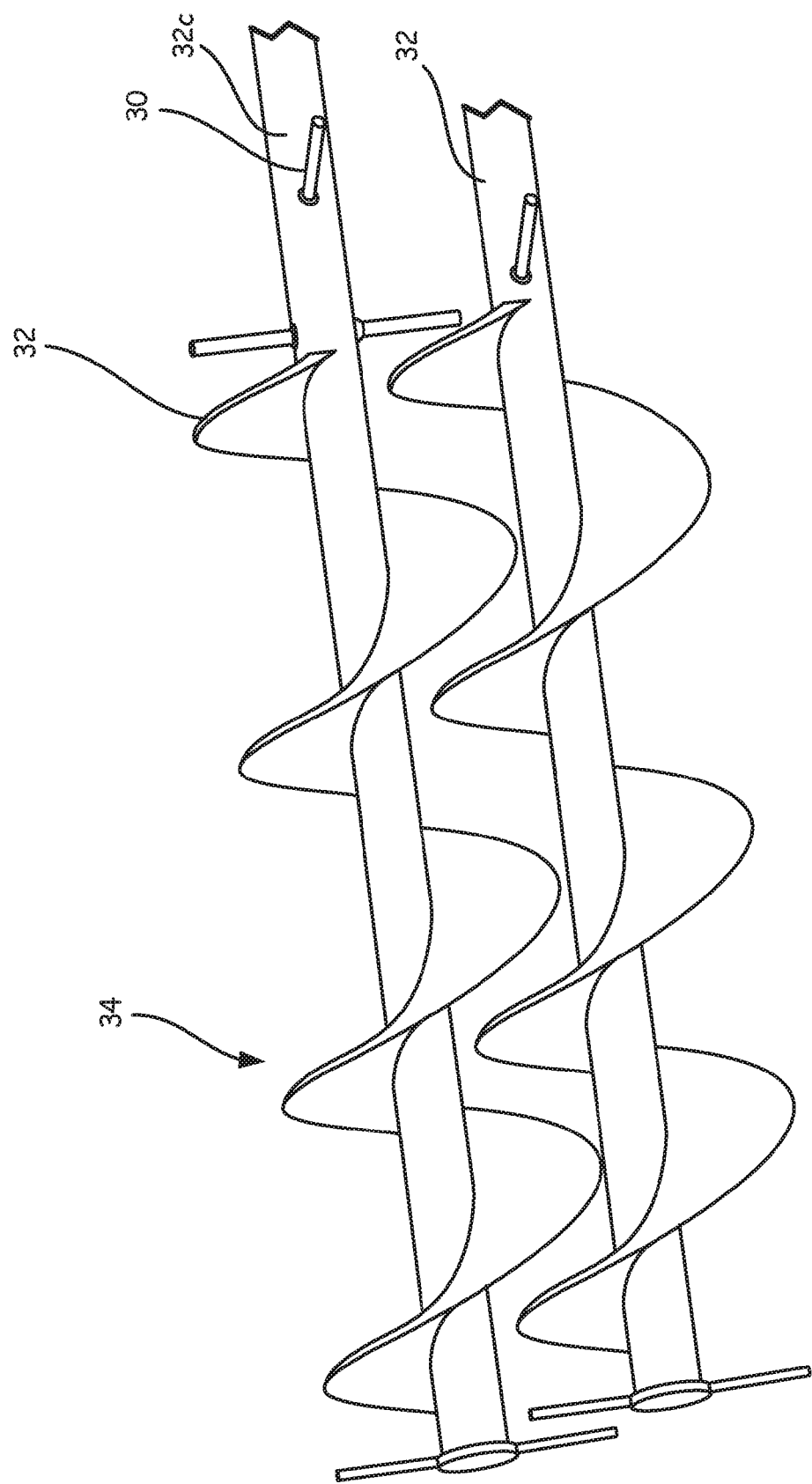
FIG. 6 depicts a side, perspective view of the auger and agitator assembly, according to the embodiment of FIG. 5.

FIG. 3 depicts an embodiment of the debris collector 10, wherein the at least one side collector 12 is operable to collect debris and deposit it into the hopper. In embodiments such as this, the side collector 12, or "basket," can be moved into a lowered position to collect debris from those operating around the hopper, and then the basket can be raised hydraulically to transfer the debris into the hopper itself. FIG. 6 depicts a close-up view of the side collector in this upper position for the transfer of debris into the hopper 6. This raising and lowering motion can be accomplished by way of a hydraulic arm or arms 16, 18, operated by a hydraulic system 40.

Figure 4:
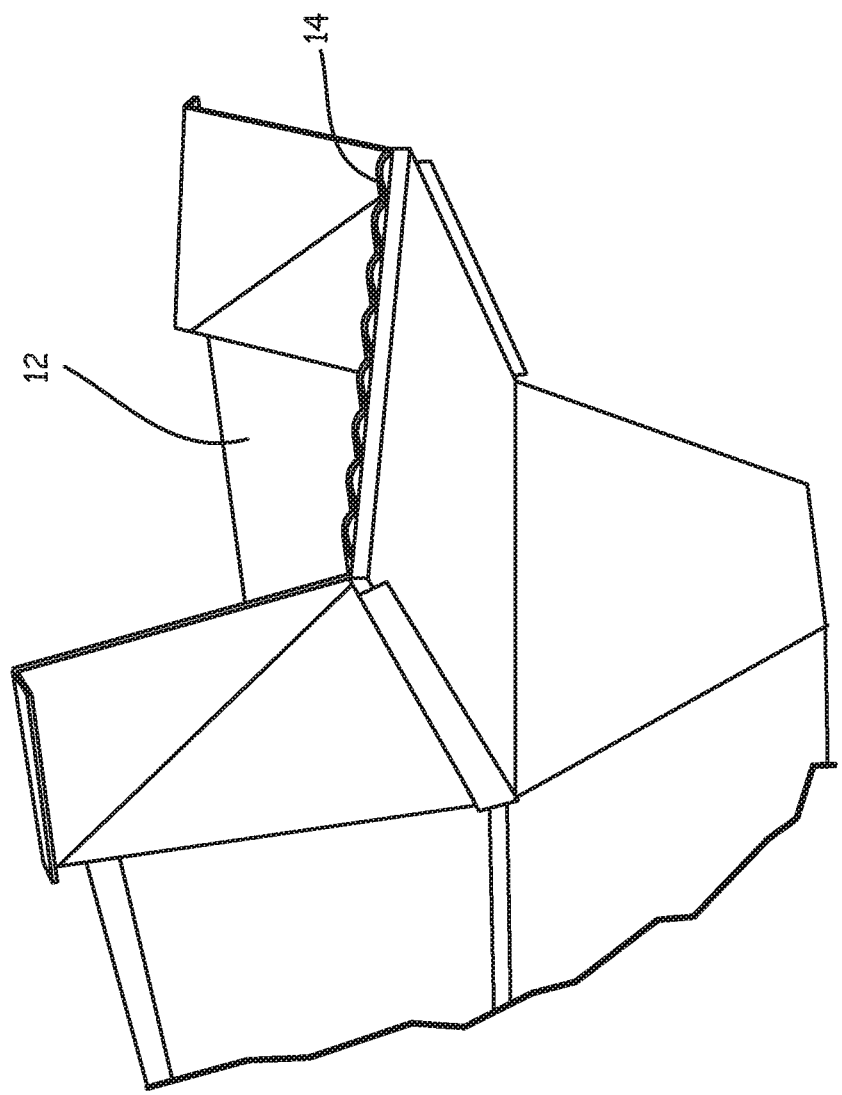
FIG. 4 depicts a read quarter view of the embodiment of FIG. 1 showing the rear collector.

As is best shown in FIG. 4, certain embodiments of the system further comprise a rear collector 14. In certain exemplary embodiments, the rear collector 14 can also be operable by way of the hydraulic system to open so as to allow the easy collection of lawn debris by the user, much in the same manner as the basket discussed in relation to FIG. 3.

Figure 5:
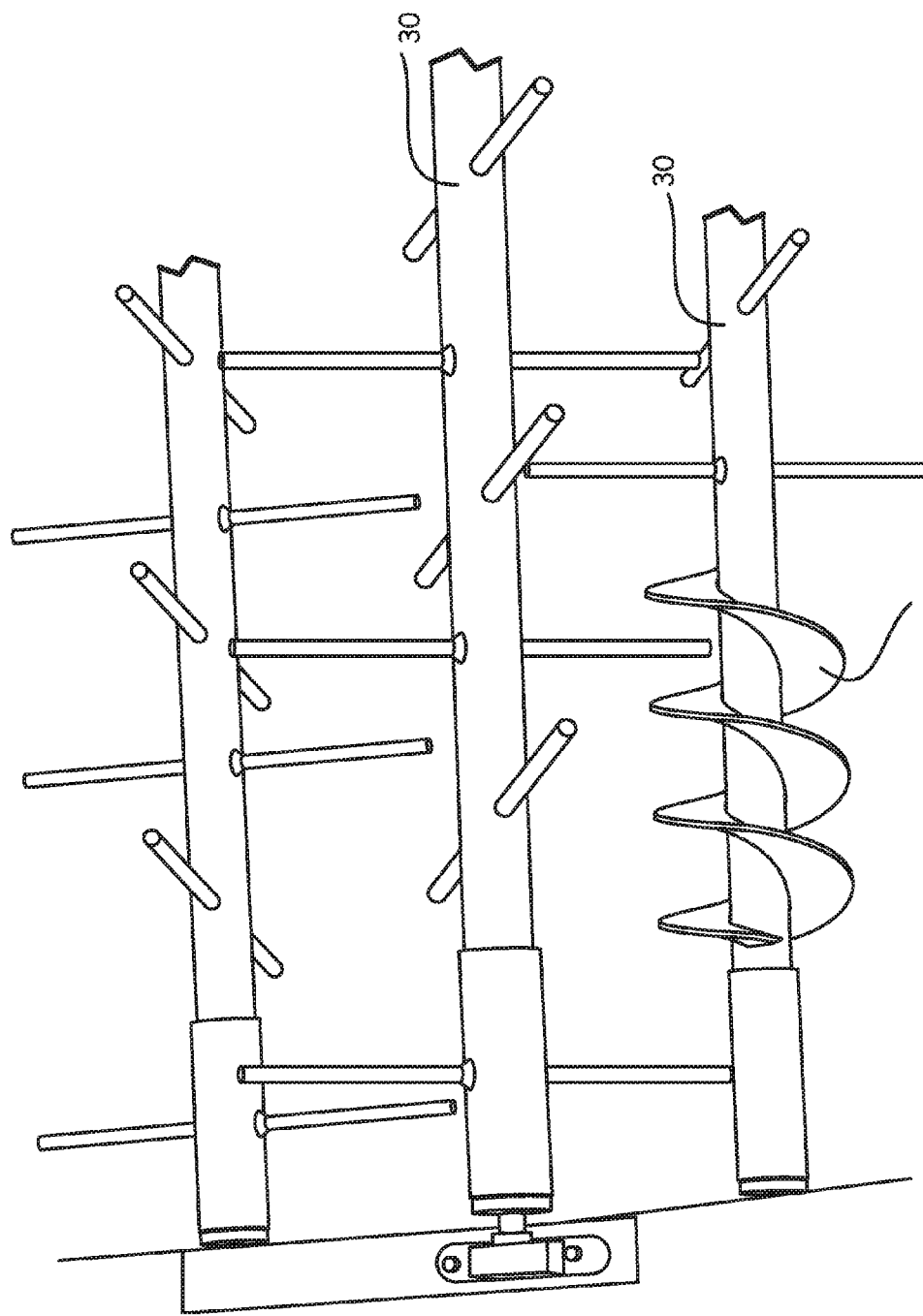
FIG. 5 depicts a top view of the auger and agitator assembly inside the debris housing, according to an exemplary embodiment.
Figure 7:
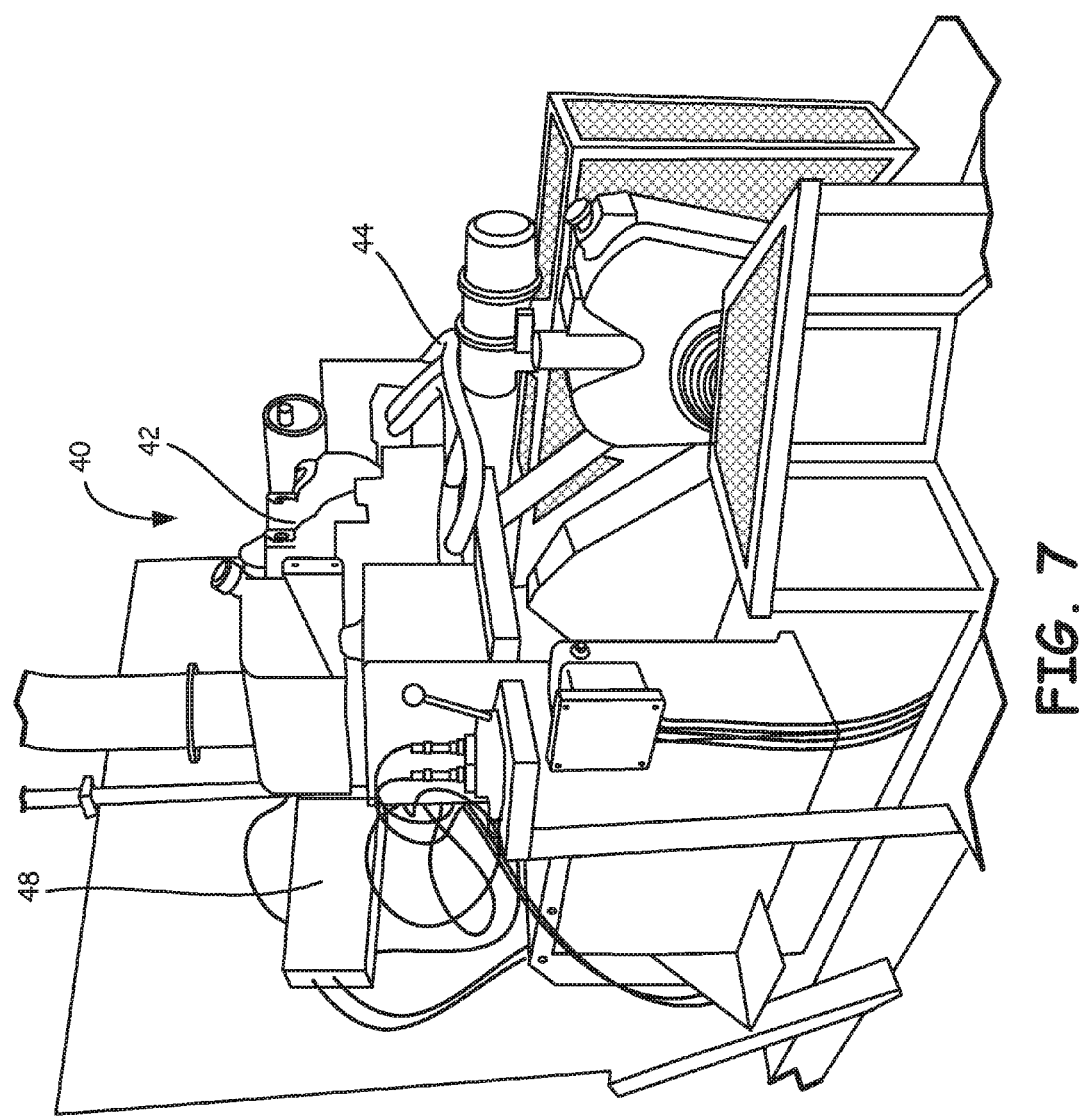
FIG. 7 depicts a front quarter view of the hydraulic system according to an exemplary embodiment.
Figure 8:
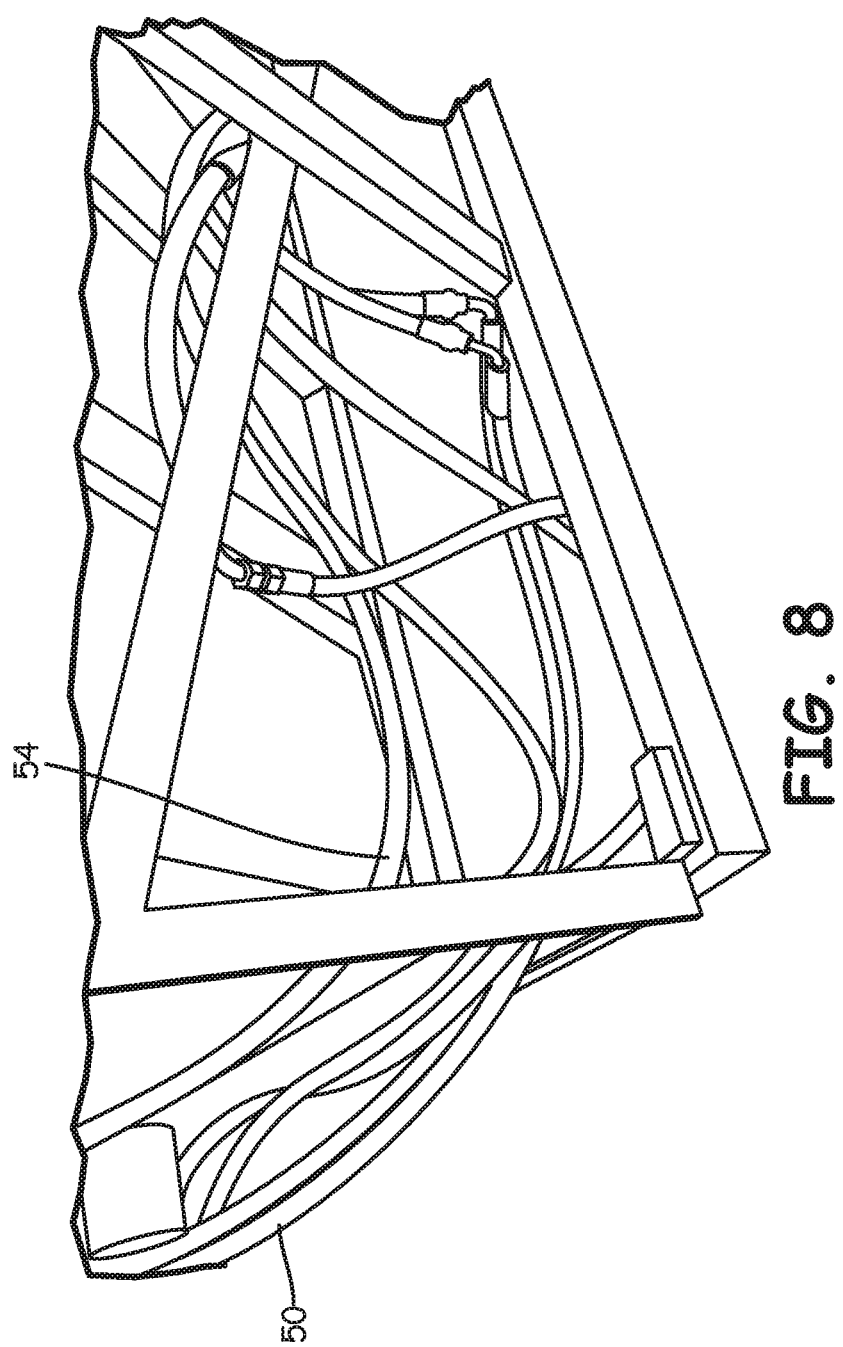
FIG. 8 depicts a perspective view of the debris collector's hydraulic system, according to an exemplary embodiment.
Figure 9:
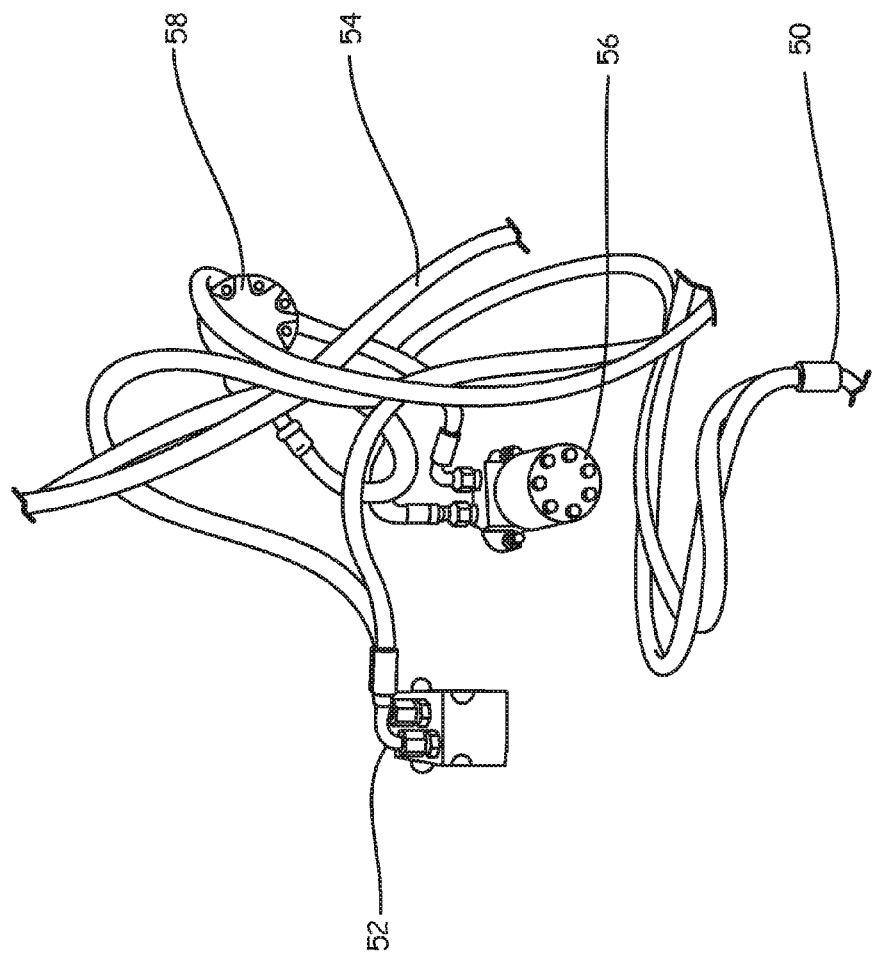
FIG. 9 depicts an endlong view of the hydraulic system and various motors according to an exemplary embodiment.

As shown in FIG. 5, exemplary embodiments of the system can further comprise at least one agitator 30 and at least one auger 32, which are in operational communication with at least one oil-driven hydraulic motor (discussed in relation to FIGS. 7-9). In these embodiments, the agitator 30 may be used to prevent bridging and other problems related to the clumping or otherwise collection of debris around and in the auger 32.

As is shown in FIG. 6, in various exemplary embodiments, the blades of the auger 32 may further comprise serrated edges 34 along the leading edge. Other configurations are possible, as would be apparent to one of skill in the art. In exemplary embodiments, at least one agitator 30 may be operationally connected to the auger axel 32C, as would be apparent to one of skill in the art. In alternative embodiments, and as discussed in relation to FIG. 15, serrated edges may be employed in relation to the fan blades.

FIGS. 7-9 depict further views of various embodiments of the hydraulic system 40. FIG. 7 depicts a perspective front view of an exemplary embodiment of the debris collector 10. In this embodiment, the debris collector comprises at least one hydraulic motor 42 attached to at least one hydraulic pump 44. In certain embodiments, a plurality of pumps may be used for redundancy, though one of skill in the art would understand that various other configurations are possible. As is depicted in FIGS. 7-9, the hydraulic system may be used to power and operate a number of features of the debris collector 10, including the agitators, augers and basket, as well as other components such as hydraulic lifts for use, for example, in raising and lowering the blower discharge. In certain exemplary embodiments, at least one lever 46 can be utilized to operate individual features of the hydraulic system, as would be apparent to one of skill in the art.

FIG. 7 also depicts an exemplary embodiment of the system comprising a control box 48 for remote operation of the hydraulics related to the agitators and augers. In certain exemplary embodiments, the control box may be operated remotely, such as by a remote control device mounted elsewhere, as would be apparent to one of skill in the art (and as is shown in relation to FIG. 16).

FIGS. 8-9 depict exemplary embodiments of the debris collector having a plurality of hydraulic 50, 52, 54 lines running from the hydraulic pump or pumps of FIG. 7, either by way of the control box or not, which are in operational communication with a plurality of motors 56, 58, 60 which power the agitators and augers (as depicted in relation to FIGS. 5-6). In certain embodiments, the speed and direction of the augers and agitators can be controlled by way of a lever or other means, as would be apparent to one of skill in the art.

Figure 10:
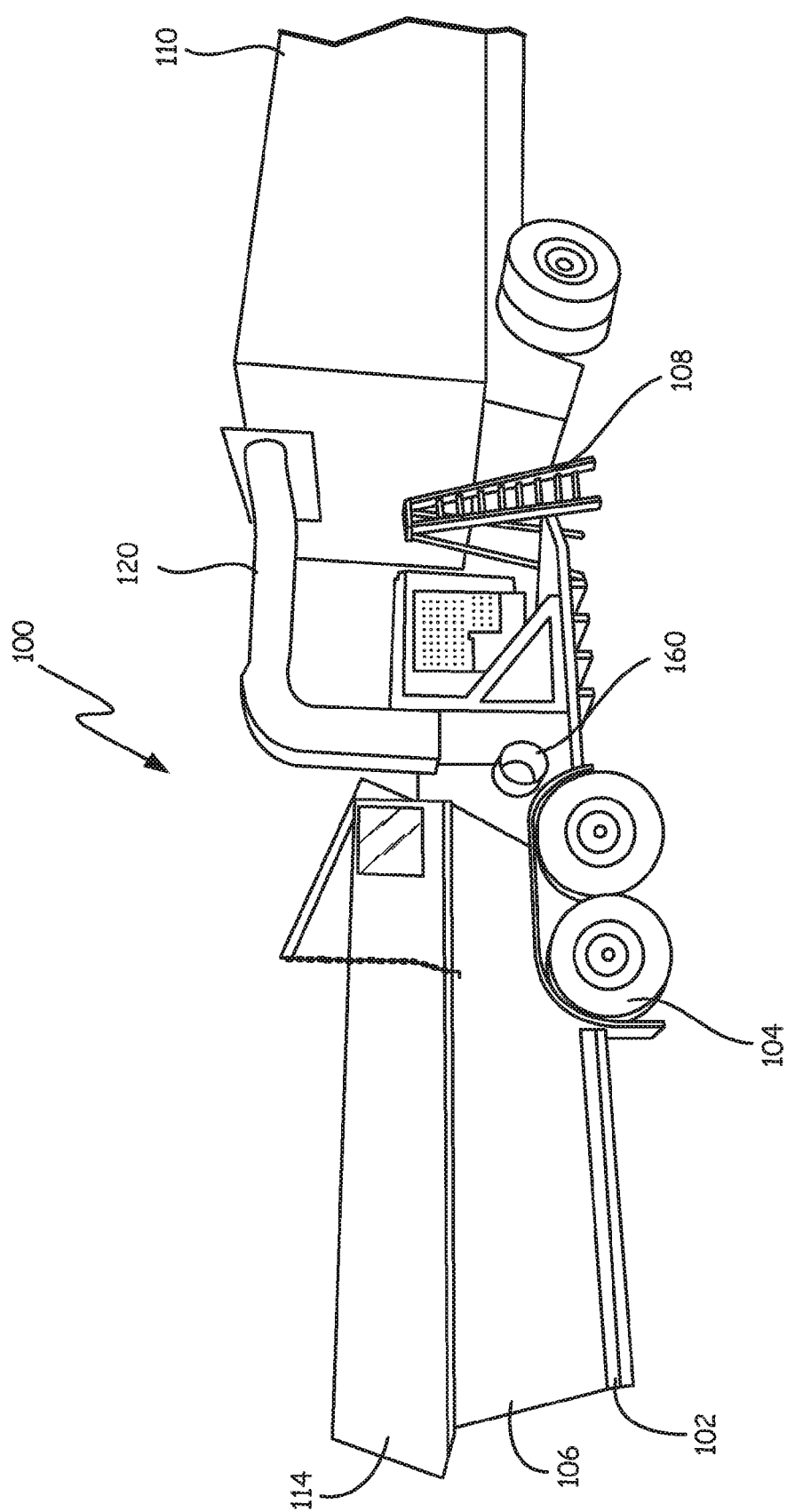
FIG. 10 depicts a side view of another exemplary embodiment of the debris collector.
Figure 11:
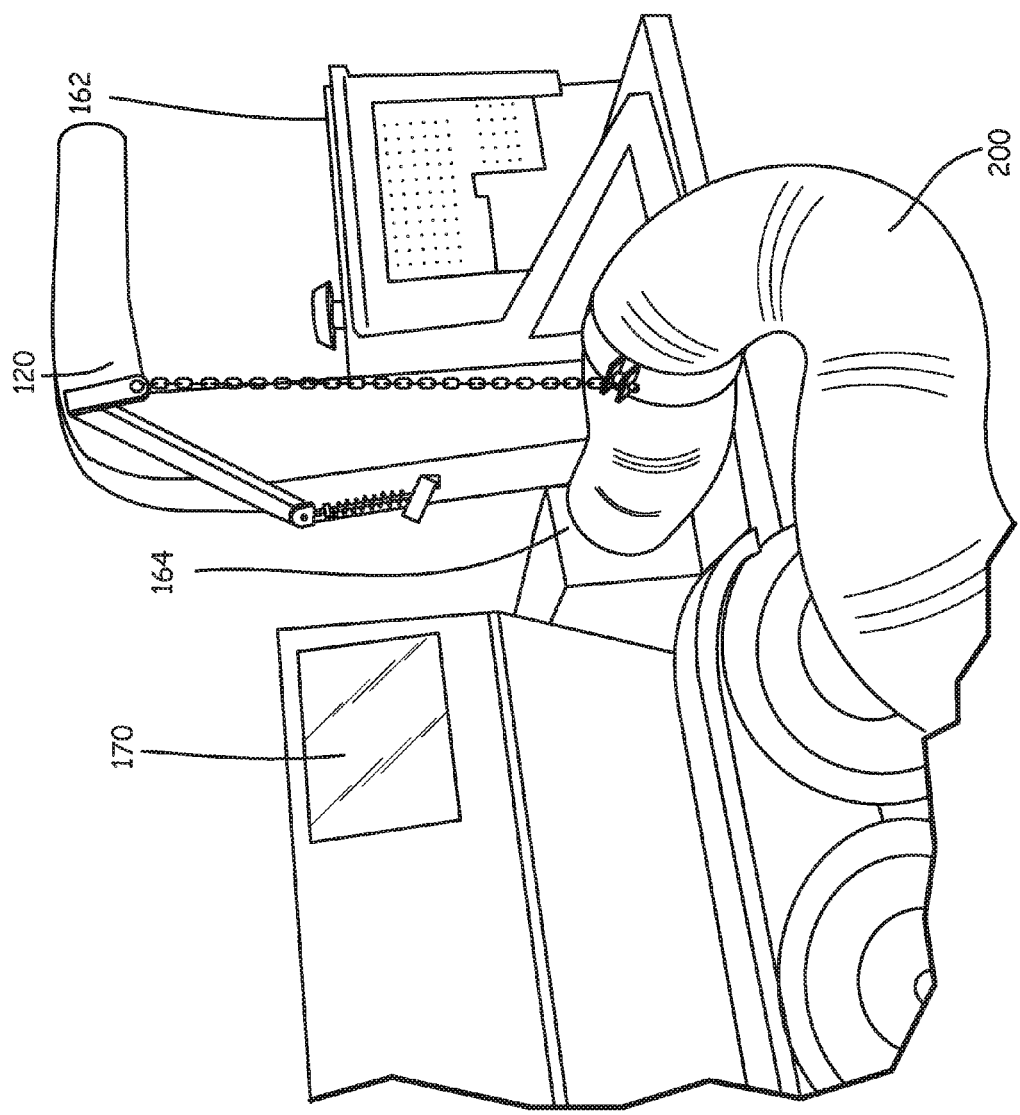
FIG. 11 depicts a further side view of the embodiment of FIG. 10.

FIG. 10 depicts an alternative embodiment of the debris collector 100. In this embodiment, the debris collector comprises a chassis 102 set on a plurality of wheels 104 for towing, and a walled, generally rectangular hopper 106 configured to receive lawn waste, and a hitch 108 for attachment to a towing vehicle 110. FIG. 10 further depicts a rear collector 114, also in an upright position. In these embodiments, however, a direct opening 160 is also present, which can be used to directly collect law debris by way of a hose 200 (as shown in FIG. 11), in the fashion of a lawn vacuum, such that the user may pass the hose over collected lawn debris for intake into the hopper and processing, chopping or shredding, by way of the fan (as is shown in FIG. 15). In these embodiments, the power source 162, such as a diesel or gas engine is configured to operate a blower fan 164 for the collection and discharge of debris by way of the discharge 120. In certain embodiments, the blower fan is run directly off the power source 162 by way of a crankshaft and clutch, while the power source 162 is also configured to operate the augers and agitators by way of a hydraulic system, as has been previously discussed in relation to FIGS. 5-9.

Figure 12:
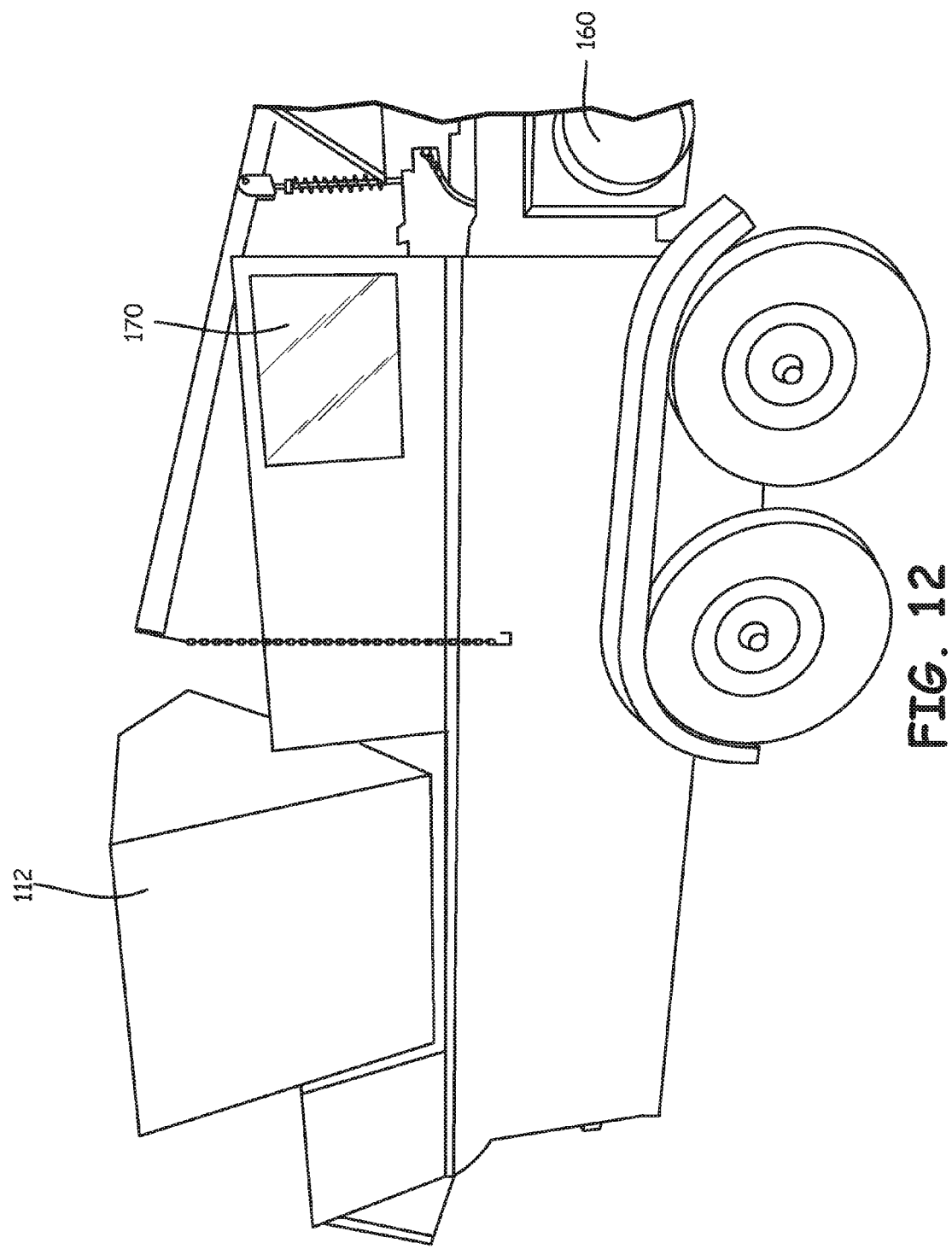
FIG. 12 depicts a reverse side view of the embodiment of FIG. 10.
Figure 13:
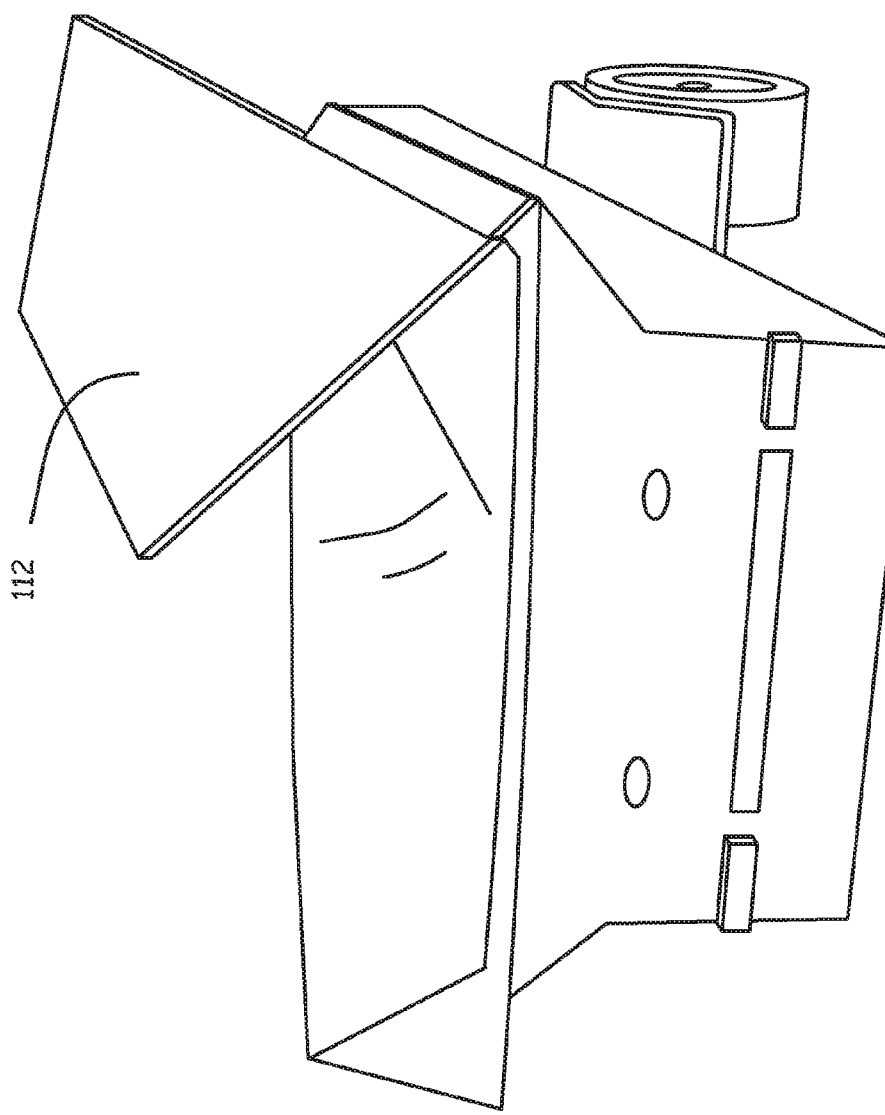
FIG. 13 depicts a perspective endlong view of the rear of the debris collector of FIG. 10.

Further, in certain embodiments the debris collector may also comprise at least one window 170, so as to allow the user to view the contents of the debris housing 106. Further, as is shown in FIGS. 12-13, in certain exemplary embodiments, these embodiments having at least one direct opening 160 may still comprise a basket 112.

In certain exemplary embodiments, and as discussed in relation to FIG. 14, the individual augers may be general elongate with fanning which is counterset at the ends of the auger 132A, 132B, 132C so as to prevent clumping. In these embodiments, the direction of fanning urges the debris generally in the direction of the fan 135 such that the rotation of the fan (shown by reference arrow "A" in FIG. 15) is sufficient to move the debris through the fan opening and out the blower discharge. As shown in FIG. 15, the blower 135 may be operationally coupled to an opening 136 at one end of the debris housing and at the terminus of the augers 132C, so as to facilitate the movement of the debris from the debris housing out the blower discharge, as would be apparent to one of skill in the art. In certain exemplary embodiments, the blades of the fan 135 may further comprise serrated edges 135A, 135B on the leading or side edge of the blades 135 so as to facilitate the grinding and processing of the debris.

Further, in certain exemplary embodiments, the auger and/or hydraulic system (shown at 40 in FIG. 7) may further comprise a pressure switch (shown generally at 172 in FIG. 16, in relation to an embodiment of the control box 148), which can detect plugging or clogging in the auger, and in turn automatically reverse the direction of the auger's flow. In certain embodiments, this is accomplished by detecting the oil pressure in the motor, and when that pressure exceeds a certain point (for example 2000 psi), the system automatically switches into reverse, thus rotating the augers and agitators in the opposite direction for a short period of time. In certain embodiments, a reversal time of approximately 1-5 seconds has been shown to have high efficacy, though other times are of course consistent with the system, though other times are within the scope of the present invention. Similarly, other pressure numbers, such as 1000-3000 psi may be appropriate, as would be determined by the exact components being utilized and as would be apparent to one of skill in the art.

Although the present invention has been described with reference to preferred embodiments, persons skilled in the art will recognize that changes may be made in form and detail without departing from the spirit and scope of the invention.

What is claimed is:

1. A debris collector, comprising:
   a. a chassis comprising a plurality of wheels and a first chassis end and second chassis end;
   b. a hopper disposed on the chassis, the hopper comprising:
      i. a housing comprising first and second ends, first and second sides, a floor and a substantially hollow central opening configured to receive debris, the hopper comprising:
      ii. at least one auger disposed within the housing opening from the first end to the second end; and
      ii. a hydraulic system; and
   c. a blower further comprising a blower fan disposed substantially at the first end of the hopper,
   wherein the at least one auger is in operational communication with the hydraulic system so as process and direct the lawn debris placed in the hopper toward the blower, and wherein the hopper is configured to prevent debris bridging.

2. The debris collector of claim 1, further comprising a power source in operational communication with the hydraulic system.

3. The debris collector of claim 2, further comprising at least one collector in operational communication with the hydraulic system.

4. The debris collector of claim 3, wherein the collector is mounted in a position selected from the group consisting of the first side, the second side, and the second end.

5. The debris collector of claim 2, further comprising at least one hydraulic motor in operational communication with the hydraulic system and the at least one auger.

6. The debris collector of claim 5, further comprising a pressure switch in operational communication with the hydraulic system and configured to reverse the rotation of the at least one auger based on oil pressure.

7. The debris collector of claim 2, wherein the blower fan further comprises serrated edges configured for shredding lawn debris.

8. The debris collector of claim 2, further comprising a plurality of hydraulic pumps.

9. A lawn debris collector, comprising:
   a. a substantially rectangular hopper comprising first and second ends, first and second sides, a floor and an opening configured to receive debris, the hopper comprising:
      i. a hydraulic system comprising a hydraulic motor; and
      ii. at least one auger configured to agitate lawn debris;
   b. a blower further comprising a blower fan disposed substantially at the first end of the hopper; and
   c. a pressure switch configured to reverse the rotation of the at least one auger by way of oil pressure from the hydraulic system.

10. The lawn debris collector of claim 9, further comprising at least one agitator.

11. The lawn debris collector of claim 9, further comprising a pressure switch in operational communication with the hydraulic system and configured to reverse the rotation of the at least one auger based on oil pressure.

12. The lawn debris collector of claim 11, further comprising a power source in operational communication with the hydraulic system.

13. The lawn debris collector of claim 9, wherein the blower fan further comprises serrated edges configured for shredding lawn debris.

14. The lawn debris collector of claim 9, further comprising a plurality of hydraulic pumps.

15. The lawn debris collector of claim 9, further comprising a direct opening disposed near the first end of the hopper and configured for the intake of lawn debris.

16. The lawn debris collector of claim 15, further comprising a hose.

17. A system for collection lawn debris, comprising:
   a. a hopper comprising first and second ends, first and second sides, a floor and a substantially hollow central portion configured to receive debris, the hopper further comprising:
      i. a hydraulic system;
      ii at least one auger; and
      iii. a device configured to prevent debris bridging;
   b. a blower further comprising a blower fan disposed substantially at the first end of the hopper;
   c. a pressure switch configured to reverse the rotation of the at least one auger;
   d. at least one collector in operational communication with the hydraulic system; and
   e. at least one opening disposed near the first end of the hopper and configured for the intake of lawn debris,
   wherein the at least one auger is in operational communication with the hydraulic system so as process and direct the travel of lawn debris placed in the hopper toward the blower.

18. The system of claim 17, further comprising at least one hydraulic motor in operational communication with the hydraulic system and the at least one auger and a pressure-sensitive switch in operational communication with the hydraulic system and configured to reverse the rotation of the at least one auger.

19. The system of claim 18, wherein the collector is mounted in a position selected from the group consisting of the first side, the second side, and the second end.

20. The lawn debris collector of claim 17, wherein the blower fan further comprises serrated edges configured for shredding lawn debris.

* * * * *